United States Patent Office 2,790,890
Patented Apr. 30, 1957

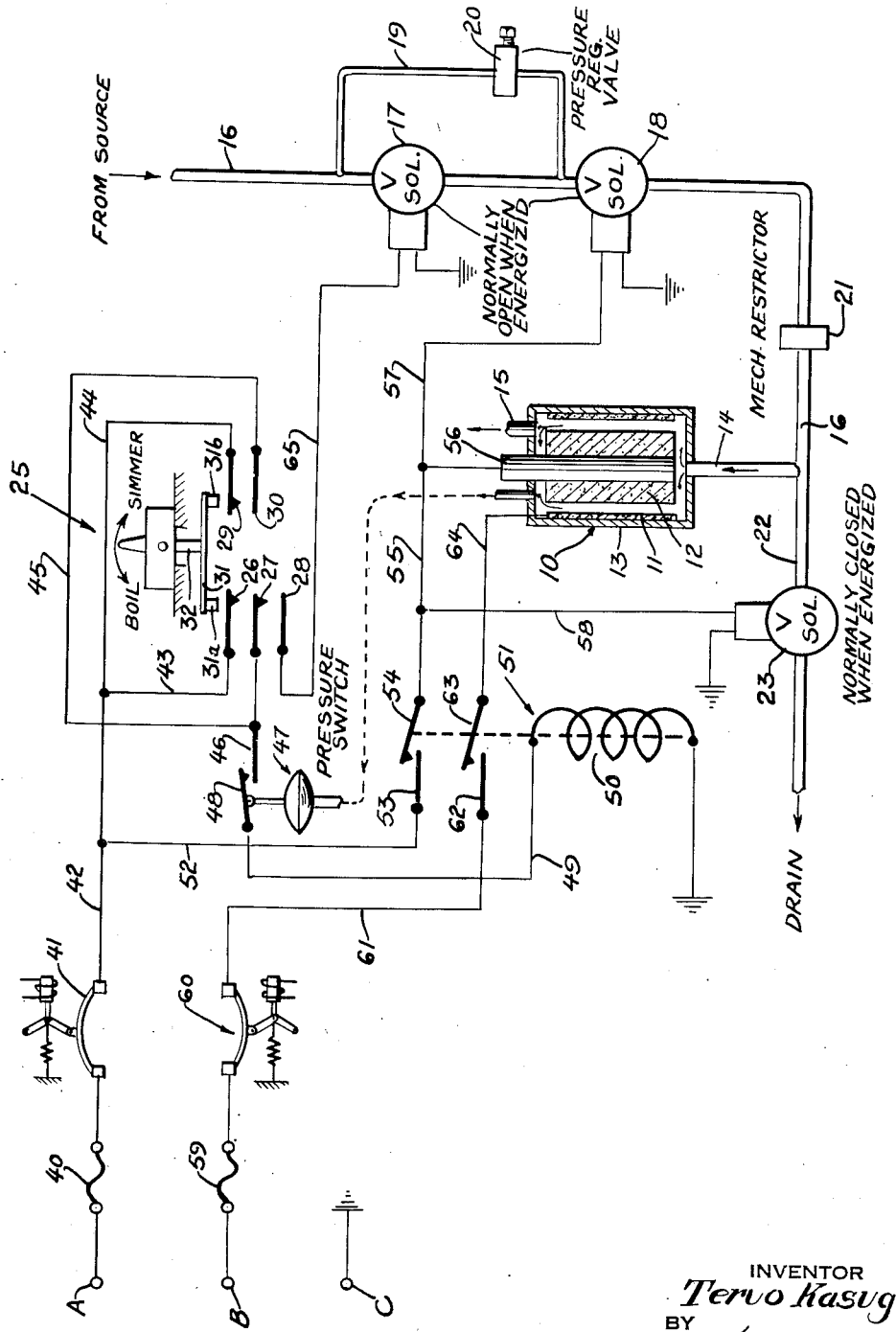

2,790,890

CONTROL SYSTEM FOR ELECTRICAL HEATERS

Teruo Kasuga, New York, N. Y., assignor, by mesne assignments, to Carbon Heater Corporation, New York, N. Y., a corporation of New York Application July 22, 1955, Serial No. 523,858

11 Claims. (Cl. 219—40)

This invention relates to electric water heating arrangements and more particularly to a control system for regulating the operation of an electric water heater in order to provide desired outputs of steam or heated water in a safe and efficient manner.

Principal objects and features of the invention are the provision of a simple, safe and effective control system for regulating an electric water heater to yield selected outputs either of steam or heated water by manual manipulation of a minimum number of control elements.

Further objects and features of the invention include the provision in the system of safety arrangements which will provide automatic cutoff both of water and of electric heating current when dangerous pressure conditions occur in the heater and automatic restoration of the system and heater to operating conditions when the dangerous conditions are relieved or eliminated.

Additional objects and features include provision of a system of this character that is inexpensive, easy to install, use and service.

Other objects and features of the invention will become apparent from the following specification and the accompanying drawing, which illustrates the electric circuit and system involved in a diagrammatic manner.

Referring to the drawing, the reference character 10 denotes generally an electric water heater or steam generator of the conduction type. Such heaters are known and include, for example, spaced apart electrodes 11 and 12 within a closed shell or casing 13. The casing 13 has an inlet conduit 14 for cold water or other fluid and an outlet 15 for either steam or vapor or for heated water or heated fluid as the case may be. Almost any type of electrically-operated water heater or steam generator may be used in the system.

The inlet conduit 14 is connected to a supply pipe line 16. This pipe line 16 is connected, for example, to a water supply source (not shown). It includes two separate and spaced-apart, sequentially disposed solenoid-controlled valves 17 and 18, both of which are of a type that is open when energized and closed when deenergized. The two valves 17 and 18 are disposed ahead of the inlet conduit 14. A by-pass conduit 19 including a manually adjustable pressure regulating valve 20 is provided. The inlet of by-pass conduit 19 is connected to the main pipe line 16 ahead of valve 17 and its outlet is connected to the pipe line 16 between the valves 17 and 18 for purposes presently to be described. Flow from the source through pipe line 16 beyond valve 18 requires either that both valves 17 and 18 be open, or if valve 17 is closed, through by-pass conduit 19 and valve 20, and open valve 18.

A mechanical restrictor 21 of conventional kind having a fixed orifice (not shown) is provided in pipe line 16 between valve 18 and the inlet conduit 14. This restrictor 21 serves to provide a limiting value to the volume of water delivered to inlet conduit 14 for a given head pressure at the source.

Pipe line 16 is extended beyond its junction with inlet conduit 14 in a portion 22 which functions as a drain. A solenoid valve 23 is included in the drain portion 22. This valve 23 is of any conventional kind which is closed when energized and open when deenergized.

The three solenoid valves 17, 18 and 23 and the electric heater are interconnected in an electric circuit now to be described, whereby the heater output may be conveniently controlled by a single selector switching device 25 to deliver automatically either steam or water at a simmering temperature as may be desired.

Power in the embodiment shown is supplied from a 220 volt 3-wire system, one of whose wires C is grounded. Wires A and B are connected as will be described.

The selector switching device 25 in the embodiment shown is a three position toggle switch including a set of three normally separated contact springs 26, 27 and 28, and a separate set of two normally separated contact springs 29 and 30. A contact closing member 31 is supported on a pivoted switch operating or manipulating lever 32. The opposite ends 31a and 31b of contact closing member 31 respectively serve to close the respective sets of contact springs. Thus, a swing of lever 32 counterclockwise from its neutral or off position shown in the drawing will cause end 31a to effect circuit closing engagement of the set of three contact springs 26, 27 and 28. A clockwise swing of lever 32 from its neutral or off position will cause end 31b to effect circuit closing engagement of the set of two contact springs 29 and 30.

Wire A of the power line is connected through a fuse 40 and circuit breaker 41 by the wires 42 and 43 to selector switch contact spring 26. It is also connected by wire 44 to the contact spring 29. Contact springs 27 and 30 are interconnected by a wire 45 which is also connected to the fixed contact 46 of a normally closed pressure switch 47 of any conventional type. This pressure switch 47 is associated with the heater 10 so as to be responsive to pressures developed within the casing 13. It can be adjusted in conventional ways to cause a break in the normal circuit closing engagement between contacts 46 and 48 at any selected pressure within the heater.

The movable contact 48 of pressure switch 47 in turn is connected by a wire 49 to one terminal of the operating coil 50 of a conventional double pole, single throw solenoid switch 51. The other terminal of coil 50 is connected to ground.

The wire 52 connects wire 42 to one of the fixed contacts 53 of the solenoid switch 51. The movable contact 54 associated with fixed contact 53 is connected by a wire 55 to the conductive rod 56 which supports the electrode 12. Wire 55 is also connected by an extension 57 to a terminal of the coil (not shown) of solenoid valve 18 whose other terminal is connected to ground. Wire 55 is also connected by a wire 58 to one terminal of the drain solenoid valve 23 whose other terminal is connected to ground.

The wire B of the power line is connected through a fuse 59 and circuit breaker 60 by wire 61 to the second fixed contact 62 of the solenoid switch 51. The movable contact 63 associated with fixed contact 62 is connected by wire 64 to the electrode 11 of the heater 10.

Spring contact 28 of the selector switch 25 is connected by wire 65 to one terminal of the coil (not shown) of solenoid valve 17 whose other terminal is connected to ground.

For operation to secure steam the switch 25 is moved from its neutral position shown to its boil position by, for example, a counterclockwise rotation to cause the end 31a of its lever 31 to move its separated contact springs 26, 27 and 28 into circuit closing condition. This initiates operation of the system as a whole by establishing electric current flow needed to energize and open both solenoid valves 17 and 18 to permit water to flow in pipe line 16 through restrictor 21 into inlet conduit 14 of the heater. Needed current flow is also established in the drain control solenoid valve 23 to energize and close it. A current flow is established in the operating coil 50 of solenoid switch 51 and this energization causes current closing movement of the movable switch contacts 54 and 63 relative to their respective stationary contacts 53 and 62.

The described current flows occur as follows: From wire A via fuse 40, circuit breaker 41 and wire 42, wire 43, contacts 26, 27 and 28 and wire 65 through the coil (not shown) of solenoid valve 17 to ground, thus energizing the coil and opening valve 17. Simultaneously, current flow occurs from wire 42 via wire 43, spring contacts 26 and 27, the fixed contact 46 and movable contact 48 of pressure switch 47, wire 49 and operating coil 50 of solenoid switch 51 to ground, thus operating said switch 51 and causing circuit closing contact of its respective pairs of contact elements 53, 54 and 62, 63. Current then can also flow from wire 42 via wire 52 through closed contacts 53 and 54, wire 55 and wire 57 to the coil (not shown) of solenoid valve 18 to ground, thus energizing the latter coil and opening valve 18. Simultaneously, current then also flows from wire 42 in the circuit comprising wire 52, closed contacts 53, 54 of solenoid switch 51, and wire 58 through the solenoid coil (not shown) of drain solenoid valve 23 and ground, operating and closing drain valve 23.

Water from the source now flows from pipe line 16 into the spaces between electrodes 11 and 12 via inlet conduit 14 and is heated to boiling temperature by electric conduction of current flowing from wire A via fuse 40, circuit breaker 41, wire 42, wire 52, closed contacts 53 and 54, wire 55, electrode 12, through the water in the space between the latter and electrode 11, wire 64, closed contacts 63 and 62, wire 61, circuit breaker 60 and fuse 59 to power wire B. In the embodiment shown, the voltage between wires A and B is approximately 220 volts and the current flow through the heater 10 in one practical embodiment is approximately 60 amperes or approximately at 13.2 kws., the heater being rated to deliver steam at from 40 to 60 lbs. per hour at operating pressures ranging from 60 to 100 p. s. i. It is understood, of course, that operation of heaters of other ratings can be effected with the circuits just described. Likewise, heaters with multiple electrodes rather than a single pair of electrodes can be used.

As long as the selector switch 25 remains in the boil position described, steam generation occurs and the generated steam is delivered via outlet 15 for use as needed. If during use it is necessary to cut off the flow of steam from outlet 15 to the apparatus using it, for example, by closing off a control valve (not shown) in the outlet pipe 15, pressure of steam being generated within the operating heater 10 will rise until it reaches and possibly rises slightly above a value to which the pressure responsive switch 47 has been set to operate to open circuit condition. As soon as pressure switch 47 is actuated by such steam pressure in heater 10 to its open condition its movable contact 48 is separated from its fixed contact 46. This interrupts current supply via wire 49 to the coil 50 of the solenoid switch 51. In consequence the movable contacts 54 and 63 of solenoid switch 51 are separated from their respective fixed contacts 53 and 62. This breaks the circuits to the electrodes 11 and 12 interrupting heating current flow in the water between the electrodes. Simultaneously, the separation of contact 54 from contact 53 of solenoid switch 51 interrupts current flow via wire 57 to the solenoid valve 18 causing the latter to close and prevent further flow of water from the source via pipe line 16 to heater inlet 14. Simultaneously, also, the same separation of the same two contacts 54 and 53 interrupts current flow via wire 58 to the drain solenoid valve 23 causing it to open. This allows residual water in heater 10 to commence relief flow via pipes 14 and 22 through open valve 23 to drain to afford rapid relief against the undesired steam pressure within the heater 10.

As soon as the pressure within heater 10 falls below the opening operating pressure of pressure switch 47, circuit closing at its contacts 46 and 48 recurs and each of the broken circuits just described are automatically reestablished by reenergization of operating coil 50 of the solenoid switch 51. In consequence, the contacts of this switch 51 again close and restore current supply to the solenoid valve 18 opening it, also to the drain solenoid valve 23 closing it, and also to the electrodes 11 and 12 to cause heating of water which again flows from pipe line 16 to the heater 10 via inlet 14. The sequence of described effects is entirely automatic and occurs in response to steam pressure conditions within the heater 10 without requiring any manual switch manipulations of any kind after the selector switch 25 has initially been moved to its boil position. Thus, the automatic safety cut-out both of current and water supply to the electrodes 11 and 12 on the occurrence of steam pressures above the response pressure of the pressure switch 47 provide for fully safe automatic operation of the heater to supply steam as demanded and required by the apparatus for which it is generated by heater 10.

When water at a simmering temperature is desired rather than steam, the selector or toggle switch 25 is manipulated to its simmer position, a clockwise rotation in the drawing, at which time the end 31b of its lever 31 moves the separated contact springs 29 and 30 into circuit closing condition, it being understood that at such time since end 31a of lever 31 has moved away from spring contacts 26, 27 and 28, the latter have separated so that the circuits previously established by the latter contacts are open.

The closure of the simmer position contacts 29 and 30 provides a path of current flow from power wire A via fuse 40, circuit breaker 41, wire 42, wire 44, contacts 30 and 29, wire 45, pressure switch contacts 46 and 48, wire 49 and solenoid switch coil 50 to ground and energization of the coil 50. This causes circuit closing movement of solenoid switch 51 and closes the hereinbefore described circuits through the respective pairs of solenoid switch contacts 53, 54 and 62, 63 so that solenoid valve 18 is energized and opened while drain solenoid valve 23 is energized and closed. Potential from power wires A and B likewise appears across the electrodes 12 and 11 via wires 55 and 64. The solenoid valve 17, however, is not energized and is closed because of the open circuit condition at contact spring 28. With valve 17 thus closed, water from the source is compelled to flow in the by-pass line 19 and through the mechanically operable pressure regulating valve 20 before it can flow via the energized and open solenoid valve 18 in pipe line 16 and via inlet 14 to the heater 10 and into the space between the electrodes 11 and 12 for heating there by electric conduction.

The pressure regulating valve 20 in by-pass line 19 is adjusted to provide a rate of flow of water from the source to the heater 10 to cause the latter operating at approximately the same voltage and current ratings hereinbefore described to act on the water in transit through the heater 10 between the electrodes 11 and 12 to the outlet 15, in such a way that the current flowing through the water will heat it to simmering temperature rather than to boiling point. The water at simmering temperature (which is just below its boiling point) passes via outlet 15 for use in any desired manner.

If while selector switch 25 is in its simmer position stoppages occur to regular flow of heated water from outlet 15 a likelihood of pressure build-up either of hot water or steam within the heater 10 exists. If it occurs, and the heater's internal pressure rises above the pressure operation setting of the pressure switch 47, its contacts 48 and 46 are separated with resultant interruption of current flow to the operating coil 50 of solenoid switch 51. This opens the circuits at the pairs of contacts 53, 54 and 62, 63 of said switch and interrupts current flow to the valve solenoid 18 causing it to close and cut off water supply. It also interrupts current flow to the drain solenoid 23 causing it to open and allow drainage of water from heater 10 via pipes 14 and 22. It also interrupts current flow through the water in the space between electrodes 11 and 12.

As soon as pressure within heater 10 drops below the operating pressure of pressure switch 47 its contacts 46 and 48 are again closed and the circuits opened by their separation as just described are restored to their closed condition automatically for further heating of water to simmering temperature.

The same safety and automatic operation is thus provided for a simmering temperature water supply as has been provided for steam supply.

With the disclosed circuit arrangements the heater 10 provides safe and automatic supply either of simmering water or steam as may be required by simple manual operation of a simple selector switch 25 to a selected operating position. Instead of water other liquids may be supplied to the heater for vaporization or for heating to a selected temperature in accord with the position of the selector switch 25. Also, regulation of valve 20 can control the heating effect on water to other desired temperatures rather than to a simmering temperature.

The described control system in effect permits heating of water or other liquid to different desired extents by operation of the selector switch to different selectable positions.

While a specific embodiment of the invention has been disclosed, variations within the scope of the claims are possible and are contemplated. There is no intention, therefore, of limitation to the exact details described and shown.

What is claimed is:

1. A control system for an electrical conduction type heater for providing selectively controllable heating effects on liquid admitted to the heater comprising electric selector switching means movable to different circuit closing positions, liquid flow control means, pressure responsive electric switching means, electric circuit means interconnecting said selector switching means, said flow control means and said pressure responsive switching means to provide a determined flow of liquid through the heater and an electric heating current flow through said liquid in one circuit closing position of said selector switching means, and a different determined flow of liquid through the heater and an electric heating current flow with different heating effect through such differently flowing liquid in another circuit closing position of said selector switching means, said pressure responsive switch means acting in either position of said selector switching means to interrupt electric current flow in the circuit means upon rises of pressure in said heater above a determined value and acting automatically to restore the interrupted electric current flow upon fall of pressure in said heater below said determined value.

2. The control system of claim 1 wherein said liquid flow control means includes a pair of sequentially disposed electrically operated valves that are open only when energized by electric current and which are disposed in advance of the heater, and adjustable by-pass means around one of said valves.

3. The control system of claim 1 wherein said flow control valve means includes an electrically-operated drain valve that is closed only when energized by electric current and which is disposed to allow drainage of the heater automatically whenever electric current flow is interrupted.

4. The control system of claim 1 wherein said flow control valve means includes a pair of sequentially disposed solenoid valves that are disposed in advance of the heater and that are open only when electrically energized, by-pass means around one of said valves and a drain solenoid valve that is closed only when electrically energized and which is positioned to allow drainage of liquid from the heater automatically whenever electric current flow is interrupted.

5. A control system for an electrical conduction type heater comprising a liquid supply line to the heater, a pair of sequentially disposed electrically-operated valves in said liquid supply line in advance of said heater, adjustable by-pass means around one of said pair of valves, a drain controlling electrically-operated valve in said supply line beyond said heater, an electric pressure switch operatively responsive to internal pressures occurring within said heater, an electrically-operated switch, a manually operable selector switch having selective operating positions, circuits connecting said switches, said heater and said electrically-operated valves to provide electric current for actuation of the pair of sequentially disposed valves to open condition and the drain valve to closed condition and to provide electric current for heating liquid flowing to the heater upon an operation of the selector switch to one of its selective operating positions while pressures below a determined internal pressure exist within the heater, said pressure switch providing automatic cut-off of electric current on occurrence of pressures in the heater above said determined internal pressure and also providing automatic restoration of said current upon reduction of pressure within the heater below said determined value, and additional circuits connecting said switches, said heater, the non-by-passed one of said sequentially disposed valves and said drain valve to provide electric current for actuating said last named one of said sequentially disposed valves to open condition and the drain valve to closed condition and also to provide electric current for heating liquid then flowing to the heater via said by-pass means and said last-named one of said sequentially disposed valves upon operation of said selector switch to another of its selected position while pressures below the determined internal pressure exist within said heater and said pressure switch providing automatic cut-off of the last named electric currents on occurrence of pressures within the heater above said determined pressure and also automatic restoration of the last named currents upon reduction of pressure within the heater below said determined value.

6. A control system for an electrical conduction type of heater comprising a water supply conduit for the heater, a pair of sequentially disposed solenoid valves connected in the supply conduit in advance of said heater, a by-pass conduit around one of said valves, flow regulating means in said by-pass conduit, a drain controlling solenoid valve, an electric pressure switch operatively responsive to pressures existing internally of said heater, a solenoid switch, a manually operable selector switch having "off," "boil" and "simmer" positions, circuital connections between said switches, said heater and said solenoid values to provide energization of all said solenoid valves and electric steam generating current flow through water admitted to said heater when said selector switch is in the "boil" position and the internal heater pressure is below a determined value, said pressure switch providing automatic current cut-off upon the occurrence of internal heater pressures above said determined internal pressure, and additional circuital connections between said switches, said heater, said drain solenoid valve and the non-by-passed one of said sequentially disposed solenoid valves to provide energization only of the drain solenoid valve and said last-named one of said sequentially disposed solenoid valves and also simmer heat generating electric current flow through the heater when said selector switch is in its "simmer" position and the internal heater pressure is below said determined internal pressure value within the heater, said pressure switch again providing automatic current cut-off upon the occurrence of internal heater pressures above said determined internal pressure value.

7. A control system for an electrical conduction type heater, comprising means for supplying water to the heater, a pair of sequentially disposed, electrically operated valves in said supply means arranged in advance of said heater, by-pass means around one of said valves, flow regulating means in said by-pass means, a drain controlling electrically operated valve, electric pressure switch means responsive to pressures developed internally of said heater, an electrically operated switch, a manually operable selector switch movable from an off position to different circuit closing positions, circuital connections between said switches, said heater and said electrically operated valves to provide electric operation of all said valves upon movement of said switch to one of said circuit closing positions and electric current flow through water then admitted to said heater, said current flow occurring only while internal pressure in said heater is below a determined value and automatic current flow cut-off occurring above said determined value, and additional circuital connections between said switches, said heater, said electrically operated valve and the non-by-passed one of said sequentially disposed, electrically operated valves to provide electric operation of the drain valve and said last-named one of said sequentially disposed, electrically operated valves and also current flow through water then admitted to the heater but with different heating effect thereon in another of said circuit closing positions of said manually operable selector switch, said last-named current flow also occurring only below said determined internal pressure value and current flow cut-off occurring above said determined internal pressure value.

8. A control system for an electric conduction type heater comprising electric circuit means and selector switch means connected together and to the heater to provide electric conduction heating of one extent within the heater in one position of said selector switch means and electric conduction heating of a different extent in another position of said switch means, and pressure responsive circuit interrupting means connected in said circuit means and adapted to provide automatic circuit interruption and cessations of electric heating upon rises in pressure within the heater in excess of a predetermined value and also automatic circuit restoration and resumption of electric heating upon return of pressures within said heater to values below said predetermined value.

9. The control system of claim 8 wherein said selector switch means and said electric circuit means are so connected that conduction heating of one of said extents only may be effected in each of said two positions of said selector switching means.

10. The control system of claim 8 wherein said electric circuit means includes a solenoid switch whose operation to circuit closing condition requires said pressure responsive circuit interrupting means to be in circuit closed condition.

11. The control system of claim 8 wherein said electric circuit means includes a solenoid operated switch that is open when its solenoid is deenergized, and circuits connecting said solenoid to said pressure switch to provide energizing current for the solenoid only when said pressure switch is closed.

References Cited in the file of this patent
UNITED STATES PATENTS

| | | |
|---|---|---|
| 974,161 | Lemp | Nov. 1, 1910 |
| 1,597,362 | Henriksson | Aug. 24, 1926 |
| 1,902,842 | Eaton | Mar. 28, 1933 |